United States Patent Office 3,450,649
Patented June 17, 1969

3,450,649
PROCESS FOR THE PREPARATION OF POLYISO-CYANATE REINFORCED ELASTOMERIC FOAM
Mortimer Alexander Youker, Clearwater, Fla., assignor to E. I. du Pont de Nemours and Company, Wilmington, Del., a corporation of Delaware
No Drawing. Continuation-in-part of application Ser. No. 468,554, June 30, 1965. This application Aug. 12, 1966, Ser. No. 571,992
Int. Cl. C08f *47/08*
U.S. Cl. 260—2.5
10 Claims

ABSTRACT OF THE DISCLOSURE

A process for making improved elastomeric latex foams by frothing an aqueous latex of a sulfur-curable elastomer in which an organic polyisocyanate is added during the frothing step. In preferred embodiments polychloroprene latex is employed with an aromatic polyisocyanate and the product foam shows excellent load-bearing characteristics at a low density, flame resistance and oil resistance. The isocyanate provides a rapid gelling action that makes possible the simplification of a conventional latex foam process by elimination of steam curing and washing steps.

---

This application is a continuation-in-part of co-pending application Ser. No. 468,554 filed June 30, 1965, now abandoned. This invention relates to elastomeric foams made from natural or synthetic rubber latex by conventional frothing and gelling techniques, but having improved properties, especially in load-bearing capacity, resulting from the incorporation of organic polyisocyanates during their preparation.

Resilient foam materials are a major article of commerce, and a voluminous art has developed in meeting a great variety of specific end use requirements for this class of materials. Important types of resilient foams include (1) sponge rubber, made by the action of gas-evolving chemicals during vulcanization of conventional rubber compounds, (2) latex foam rubber, made by frothing, gelling, and curing natural rubber latex or any of a variety of synthetic rubber latices, (3) polyurethane foams, generally made by the reaction of isocyanates, low and high molecular weight polyols, and chain-extending and cross-linking compounds with gas-evolving components, and (4) plastic foams from compositions such as polyvinyl chloride plastisols, and so on. Each type has advantages in physical properties, applicable manufacturing techniques, or cost that recommends it for particular kinds of service.

Composite resilient foams of many sorts have been proposed. U.S. Patent 2,993,013, discloses a type of foam made by adding small proportions of a rubber latex to fluid, isocyanato-terminated prepolymers, the water of the latex reacting with isocyanato groups to generate carbon dioxide as a blowing agent. The resulting product is similar to conventional polyurethane foams, but its properties are somewhat modified by the small amounts of elastomeric polymer introduced from the latex. It has been proposed to modify preformed polyurethane or polyvinyl chloride foams by impregnating them with any of a variety of rubber latices, followed by drying and curing. Such products are disclosed, for example, in British Patents 977,929 and 990,198. Various composite foam products are suggested, for instance those resulting from mixing crumbs of rubber latex foam in polyurethane foam as it is made, e.g., as described in U.S. Patent 2,892,216, and those resulting from combining polyurethane and latex foam rubbers in various ways during manufacture. British Patent 748,990 is an example of the latter approach. Polyvinyl chloride plastisol foams have been modified by adding water and isocyanates during their preparation, as disclosed in U.S. Patent 3,084,127. The many and intricate disclosures in the art of attempts to make different sorts of resilient foam structures are testimony to the need for readily manufactured resilient foams with superior properties.

Rubber latex foam has achieved widespread use, especially in cushioning of all sorts. It is made by the simple and reliable frothing, or "Dunlop" process, or alternatively the Tallalay process, in both of which processes an aqueous dispersion of an elastomeric polymer, such as natural rubber latex, or the synthetic latices of styrene-butadiene rubber (SBR), polybutadiene, polychloroprene (neoprene), or acrylonitrile-butadiene rubber (ABR), are compounded with vulcanizing and thickening agents, whipped into a froth, a gelling agent added, and the gelled froth then cured to give a high quality resilient foam. When properly made, such foams are exceedingly durable and make excellent mattresses, pillows, furniture cushions, and so on. The latex foams in use up until the present however have been subject to serious limitations. One problem with latex foams has been that they can only be made in a limited range of densities if they are to have acceptable load bearing characteristics. From the standpoint of ease of handling and transporting foam products, and in order to achieve equivalent performance with a saving in materials, the need has been recognized for some time for a modification of the latex foam process that would yield lower density products with no loss in load bearing ability. Furthermore, many latex foams do not have sufficient resistance to heat and flames to allow their use in some important applications; and some of these foams, particularly the styrene-butadiene compositions when in contact with oil, tend to absorb oil and swell excessively.

It has been discovered that the basic and reliable frothing process for making latex foams in which an aqueous latex of a sulfur-curable elastomer is expanded into a foam, gelled, cured, and dried can be modified to yield low density foams with improved load bearing and in some cases improved flame resistant characteristics and other procesing advantages by the step of incorporating an organic polyisocyanate into the latex in the amount of about 10 to 100 parts by weight per 100 parts of elastomer in the latex. In some instances gelling agents need not be added and the curing and drying steps may be omitted.

The process of this invention can be applied to any of a wide variety of types of sulfur curable natural and synthetic aqueous elastomer latices, including natural rubber latex, the synthetic latices that result from emulsion polymerization of isoprene, butadiene, chloroprene and other conjugated diolefins and the copolymerization of such diolefins with such representative monomers as styrene, acrylonitrile, methacrylonitrile, and vinyl acetate. The post-formed latices made from solution-polymerized elastomers such as those from representative compounds isoprene, butadiene and isobutylene, and chain saturated α-olefin hydrocarbon copolymers, a representative example being the copolymer of ethylene, propylene, and 1,4-hexadiene, are also used. Particularly promising results in load bearing capacity are achieved by applying the process of this invention to neoprene latices of various types. A particularly preferred latex is one sold commercially as Neoprene Latex 60 which is an aqueous dispersion of a high gel polychloroprene polymer having a solids content of about 59%, an initial minimum pH of 10.5 and a Brookfield viscosity of 350 cps. Another latex often used is a styrene-butadiene latex containing about 20–25% bound styrene and having a solids content of from 60 to 73%.

It has also been found that any of a wide variety of organic polyisocyanates can be employed in practicing this invention. Pure diisocyanates, typified by 2,4- and 2,6-toluene diisocyanate (TDI) and various mixtures thereof, 4,4'-methylene-bis(phenyl isocyanate) (MDI), meta-phenylene diisocyanate, 4,4' - methylene-bis(cyclohexyl isocyanate) (PICM), and decamethylene diisocyanate can be used. Undistilled crude or partly refined polyisocyanates that result from the phosgenation of diamines such as the toluene diamines, phenylene diamines, 4,4'-methylene-bis(phenylamine), and 4,4' - methylene - bis (cyclohexylamine) are also frequently used and are preferred in this invention. Crude toluene diamines are predominantly the 2,4 and 2,6 isomers although minor amounts of the other isomers may also be present. These crude products often contain a certain proportion of undistillable condensation products with biuret and urea structures formed during preparation of the isocyanates that are not removed following phosgenation. A representative method for preparing a crude 4,4'-diamino diphenyl methane and its subsequent phosgenation to form a polyisocyanate of this type are described in U.S. Patent 2,683,730. These undistilled polyisocyanates have an average functionality greater than two, whereas the pure isocyanates employed are generally diisocyanates. A preferred crude product is an undistilled organic polyisocyanate containing about 80% MDI (based on —NCO content), prepared by phosgenating undistilled 4,4'-diamino diphenyl methane. It has an acidity of about 0.06% HCl and 0.10% hydrolyzable chloride as a result of purification essentially according to the procedure of Example 6 of French patent specification 1,399,506, except for the final distillation. Another class of crude materials useful in this invention are the methylene bridged polyphenyl polyisocyanates resulting from the phosgenation of polyamines prepared by condensing from about 1.1 to 10 moles of aniline and about 1 mole of formaldehyde in the presence of a mineral acid. A preferred composition of this class is sold commercially as "PAPI" by the Carwin Co. It contains about 50% by weight 4,4'-methylene-bis (phenyl isocyanate). The remainder of the product consists of polyisocyanates and phosgenation byproducts in such amounts that the average functionality of the entire mixture is about 3 isocyanato groups per molecule. The preparation of this product is substantially described in U.S. Patents 2,683,730 and 2,818,433. It is to be understood that various mixtures of the isocyanates mentioned herein may also be used. The isocyanates used in this invention are employed in the liquid phase; by liquid phase it is meant isocyanates or mixtures of isocyanates that are fluid at room temperature or can be made fluid by heating at temperatures up to about 70° C., or a solution in an inert solvent, i.e., an organic solvent not reactive with isocyanato groups. Phosgenation of amines to make isocyanates is often carried out in orthodichlorobenzene (ODCB) as solvent, and it has been found that in the practice of this invention, the crude phosgenation products of amines which still contain a portion of the ODCB solvent can be used. The isocyanates can usefully be employed at concentrations ranging from about 10 to 100 parts by weight per 100 parts of rubber in the latex, with about 10 to 25 parts being the preferred range. Results indicate that when "PAPI" is incorporated into the neoprene latices a preferred quantity is about 20 parts. The particular concentration used in a given foam product of course depends on the properties called for by the end use to which the foam is to be put. In general the rigidity and load bearing properties of the foam increase as the amount of isocyanate added increases.

The actual preparation of the improved foams of this invention is carried out by the standard procedures, using the normal ingredients employed by the rubber industry in making latex foam. A good review of this art can be found in Chapter 18 of "Introduction to Rubber Technology," edited by M. Morton, Reinhold Publishing Company, 1959. The special considerations that apply to making neoprene latex foam are reviewed in "Neoprene Latex," by J. C. Carl, E. I. duPont de Nemours & Company, 1962, pp. 89 et seq.

While normal procedures and materials of latex foam technology are used in practicing this invention, it is sometimes found necessary to make some adjustment to accommodate the particular degree of reactivity of the polyisocyanate that is being used. In general, the chemically less reactive curing agents, dispersing and thickening agents, and gelling agents must be used. For instance, highly active free amine-containing accelerators, and dispersing agents having a high concentration of active hydrogen-containing functional groups should be avoided. It is necessary in some cases to choose the less reactive potassium silicofluoride as gelling agent rather than the more reactive sodium silicofluoride. The selection of suitable materials is easily made by one skilled in the latex foam art by following these principles. It may be necessary in some instances to adjust the pH of the latex used to another level than that which would be used in the absence of added polyisocyanate. This can be done in the case of certain neoprene latices by normal or heat-accelerated aging of the latex, where a less alkaline latex is needed, or by addition of extra caustic when a more alkaline latex is found necessary. It has been discovered that in the processes in which neoprene latices and the preferred crude MDI polyisocyanate and "PAPI" (both described above) are used, the foams gel better at a lower pH than that of freshly prepared neoprene latices (10–12.5) and thus better results are obtained when the pH of the neoprene latex is reduced, preferably to about 9.3 to 9.8 either by natural aging or oven aging. Results are not as good when the latex pH is lowered by addition of an acid such as acetic acid. The optimum pH at which to operate the process varies with the use of different elastomeric latices and isocyanates, but can easily be determined by those skilled in the art.

The polyisocyanate may be added to the latex composition at any time prior to gellation. The preferred procedure however is to add the isocyanate during the frothing of the composition just prior to addition of the gelling agent. Addition of the polyisocyanate before the frothing step can result in premature coagulation causing processing difficulties and a lowering of the load bearing properties of the foams. Normal practice in making latex foam is to allow the gelled foam to set, cure the set foam in steam, wash the foam with water, and finally to dry the foam in an oven, where some additional curing takes place. Some variations in the procedure can be made with the polyisocyanate-modified foams of this invention, because of the extra cross-linking activity introduced by the isocyanate. A particularly advantageous aspect of this invention is that in some compositions, it is possible to omit the conventional gelling agent entirely since the isocyanate alone has considerable gelling action. Also in some instances the elastomeric latex need not even be compounded, the isocyanate is added to the latex at a convenient time either before, during, or after frothing of the latex and the cross-linking action of the isocyanate causes the foam to gel and cure. For foarms to be used in some applications, no oven cure is needed at all, and in some instances, the washing and steam curing steps may be omitted. The selection of procedures to be applied in making a particular polyisocyante-modified latex foam can easily be made by one skilled in the art, following the teachings of this invention and the particular examples discussed below.

The modification of latex foam by polyisocyanates in some ways introduces much greater latitude in the manufacture of latex foam. As already mentioned, useful foams of much lower density than those of the prior art can be made. Good foams can be made from elastomer latices of lower solids content than those generally used in this art (it is usual to employ elastomer latices of about 60% or higher solids content in the latex foam art). Thus, the creaming step that is used to bring latices to higher solids content can often be avoided by following the process of this invention. For instance, a good foam can be made from 50% solids neopren latex, where about 60% solids latex is necessary following prior art procedures. The isocyanate-modified foams in some formulations have better characteristics, for instance better oil resistance, than unmodified foams made from the same latex (see Example 2 below).

As stated above it has also been found that in some compositions the isocyanate-modified latex foams have substantially better flame resistance than similar but unmodified latex foams. This unexpected property is especially important in latex foam mattresses for use aboard ships or in public accommodations where strict regulations are in force with respect to flammability of materials. (See Example 5 below.)

In practice of this invention is particularly illustrated by the following examples, in which ingredients are given as parts by weight per 100 parts of rubber solids (phr.). Throughout the examples several different elastomeric latices and organic polyisocyanates are used. These latices and polyisocyanates have the compositions indicated below and will hereafter appear by the following designations:

Neoprene latex type 1: A high gel aqueous dispersion of a polychloroprene polymer having a pH of 10.7, solids content 59%, and Brookfield viscosity of 350 cps. This latex is prepared by the process described in U.S. Patent 2,405,724.

Neoprene latex type 2: An aqueous dispersion of a polychloroprene polymer having an initial pH of 12, a solids content of 50%, and Brookfield viscosity of 23 cps. This latex is prepared by the process described in U.S. Patent 2,657,991 Example 1.

SER latex: An aqueous dispersion of a styrene-butadiene copolymer having a solids content of 73%, pH of 10.5 and a Brookfield viscosity of 1330. The copolymer contains about 23% styrene.

The natural rubber latex is supplied by Naugatuck; it has about 60% solids content.

The ABR latex is supplied by Firestone under the identification FRN–251. The polymer is found by nitrogen analysis to contain about 27% acrylonitrile. The latex is of about 60% solids content, pH of 11.5.

The EPDM rubber latex is prepared from an ethylene/propylene/1,4-hexadiene copolymer of Mooney viscosity 70, following broadly the procedure described in Example 14 of British patent specification 1,016,463, modified for essentially continuous operation, the latex being of about 60% solids content and pH of 9.9.

Polyisocyanate A: An undistilled polyaryl polyisocyanate mixture prepared by the phosgenation of polyamines prepared by condensing aniline and formaldehyde in a mineral acid. This process is described in U.S. Patent 2,683,730. The product contains about 50% by weight 4,4'-methylene bis-(phenyl isocyanate). The remainder of the product consists of polyisocyanates and phosgenation by-products in such amounts that the average functionality of the entire mixture is about 3 isocyanato groups per molecule. The product is sold commercially by the Carwin Company as "PAPI."

Polyisocyanate B: A polyisocyanate prepared from toluene diamine 80% 2,4; 20% 2,6 dissolved in ODCB, phosgenated by the procedure given in U.S. Patent 2,822,373. The ODCB is removed by fractional distillation. The undistilled product (TCPA) contains about 85% volatile TDI (toluene diisocyanate).

Polyisocyanate C: 80% 2,4; 20% 2,6 toluenediisocyanate.

Polyisocyanate D: An organic polyisocyanate prepared by phosgenating undistilled 4,4'-diamino diphenyl methane by the procedure described in U.S. Patent 2,822,373. The final product contains 50% 4,4'-methylene bis(phenyl isocyanate) based on —NCO content.

Polyisocyanate E: 4,4'-methylene-bis(cyclohexylisocyanate).

Polyisocyanate F: A crude organic polyisocyanate prepared by the phosgenation of undistilled 4,4'-diamino diphenyl methane. The product contains about 80% 4,4'-methylene-bis(phenyl isocyanate) and has an acidity of about 0.06% HCl and 0.10 hydrolyzable chloride. It is prepared essentially according to the procedure of Example 6 of French patent specification 1,399,506, except for the final distillation.

Polyisocyanate G: Decamethylene diisocyanate.

The compression/deflection tests are made in accordance with ASTM–D–1546–64T.

EXAMPLE 1

The effect of incorporating an organic polyisocyanate during the preparation of a neoprene latex foam is illustrated as follows:

A. Preparation of compounded latex

Three samples (1–3) of a compounded neoprene latex are prepared by mixing together the following materials (Sample 3 is outside the scope of the invention):

|  | Dry weight |
|---|---|
| Neoprene latex type 1 | 100 |
| Zinc oxide | 7.5 |
| Phenyl-beta-naphthylamine | 2 |
| Trialkyl thioureas [1] ("Thiate B") | 2 |
| Sodium dibutyl dithiocarbamate | 1 |
| Petrolatum | 3 |

[1] Product sold commercially by the Vanderbilt Chemical Company.

B. Preparation of gelling systems

Separate gelling systems are prepared to be added to the neoprene lactices as follows:

Sample 1

|  | Parts |
|---|---|
| Potassium silicofluoride (PSF) | 2 |
| Foam stabilizer | 0.1 |

Sample 2

No gelling agent is used.

Sample 3

|  |  |
|---|---|
| Catechol | 1 |
| Sodium silicofluoride (SSF) | 2 |
| Foam stabilizer | 0.1 |

The foam stabilizer contains the following components: C-cetylbetaine 50 parts, sodium alkylsulfates 40 parts, sodium salt of alkylnaphthalene sulfonic acid 10 parts and water 567 parts.

C. Addition of organic polyisocyanate

The following proportions of organic polyisocyanate A are added to the samples along with indicated proportions of dimethyl polysiloxane-polyethylene-propylene oxide block copolymer, a product sold commercially as SF–1034.

|  | Polyisocyanate A | Block Copolymer |
|---|---|---|
| Sample No.: |  |  |
| 1 | 100 | 2 |
| 2 | 20 | 0.4 |
| 3 | 0 | 0 |

The pH of the latex is adjusted prior to compounding. The latex is compounded with all ingredients except the gelling system and the isocyanate additive. The compounded latex is frothed with a Hobart mixer and wire whip (usually taking 2–3 minutes), the isocyanate is added and mixed in; one minute later the gelling system is added and mixed in for about one minute and then poured into a mold and leveled before gelation occurs.

The density of the foam is adjusted by either regulating the weight of the composition used to form a sample of fixed froth height, or by controlling the froth height of a fixed weight of compounded latex.

After gelation, the foam is demolded and aged overnight at room temperature prior to a curing-drying exposure at about 250° F. The overnight aging is not essential, in fact, it is preferable to operate without such an aging step because of the delay involved. The foam is not washed. (The presence of catechol in the gelling agent of sample 3 does not affect the results shown.

D. Effect of polyisocyanate on physical properties of the neoprene latex foams

| Sample No. | Density [1] | Compression/Deflection in p.s.i. at— | | Volume Shrinkage, percent |
|---|---|---|---|---|
| | | 25% | 50% | |
| 1 | 7.3 | 2.7 | 10.5 | 31 |
| 2 | 7.3 | 1.1 | 2.3 | |
| 3 (control) [2] | 7.1 | .36 | .63 | 43 |

[1] Lb./cu. ft.
[2] Sample 3 is outside the scope of the invention and is included for comparison purposes only.

EXAMPLE 2

The effect of isocyanate addition in foams prepared by using several different types of elastomeric latices is illustrated as follows:

A. Preparation of compounded latices

Eleven samples of compounded elastomeric latices are prepared as follows:

Samples 1 and 2

| | Dry weight |
|---|---|
| Neoprene latex type 2 | 100 |
| Petrolatum | 3 |
| Foam masterbatch | 15.3 |
| Sodium dibutyl dithiocarbamate | 2 |

The foam masterbatch is prepared as follows: Zinc oxide: 55 parts, phenyl-beta-naphthylamine: 15 parts, thiocarbanilide: 15 parts, sulfur: 15 parts, lignin sulfonate:[1] 10 parts and water: 57 parts.

Sample 3

Compounded same as Example 1, sample 1, except the neoprene latex has a pH of 9.7.

Samples 4–11

Eight samples (4–11) are prepared from various latices as follows: Samples 4 and 5 are based on SBR, 6 and 7—natural rubber, 8 and 9—ABR, 10 and 11—EPDM. The recipes of samples 4, 6, 8 and 10 are as follows:

[1] 10% solution

| | 4 | 6 A | 6 B | 8 | 10 |
|---|---|---|---|---|---|
| Rubber Latex | 100 | 100 | | 100 | 100 |
| Potassium Oleate | 0.5 | 1 | 0.7 | 0 | 0 |
| Ethyl Zimate | 1 | 0.75 | 0.25 | 1 | |
| Sulfur | 2.25 | 0.5 | 1.5 | 2.25 | 2 |
| Thiuram E (tetraethyl thiuram disulfide) | | | | | 3 |
| Zinc salt of mercaptobenzothiazole | 1.5 | | 1 | 1 | 1 |
| Thiocarbanilide | | | | | 3 |
| 2,2'-methylene-bis(4-methyl-6-t-butyl phenol) | 1 | | | 1 | |
| Trimene base (reaction product of ethyl chloride, formaldehyde and ammonia) | 1 | | 1 | 2.0 | 1 |
| Zinc oxide | 5 | | 5 | 5 | 5 |
| Styrenated Phenol | | 1 | | | |

Samples 5, 7, 9 and 11 are controls included for comparison purposes only. In each case they are compounded the same as their counterpart containing the same rubber latex with the exception that sample 9 contains 0.5 part potassium oleate and no trimene base. When compounding the latices based on natural rubber (samples 6 and 7) the ingredients listed in column A are added first, and then the composition is aged overnight before adding the ingredients listed in column B.

B. Preparation of gelling systems

Gelling systems are prepared for the eleven samples as follows:

Samples 1 and 2

| | Parts |
|---|---|
| Foam stabilizer (as prepared in Example 1, sample 1) | 0.1 |
| SSF | 1 |
| PSF | 1 |

Sample 3

| | Parts |
|---|---|
| Foam stabilizer (as prepared in Example 1, sample 1) | 0.1 |
| PSF | 2 |

Samples 4 and 5

| | Parts |
|---|---|
| Foam stabilizer (as prepared in Example 1, sample 1) | 0.1 |
| SSF | 2 |

Samples 6–11

Samples 6 and 7 each contain 2 parts of SSF.
Sample 8 contains 5 parts SSF and sample 9, 4 parts SSF.
Sample 10 contains 1 part PSF and sample 11, 4 parts PSF.

C. Addition of polyisocyanate

To samples 1, 3, 4, 6, 8, and 10 are added 20 parts of polyisocyanate A. No polyisocyanate is added to the controls 2, 5, 7, 9 and 11. Also to sample 1 is added 0.4 part of the block copolymer described in Example 1.

The same procedure for preparing the foams is used as described in Example 1. The following table illustrates the effect of polyisocyanate A on the various foam latices. (The slight variations of the compounding and gelling ingredients as shown above in some of the samples and their controls have no significant effect on the results indicated.)

|  | Density, lb./cu. ft. | Compression/Deflection in p.s.i. at— | | Volume Shrinkage, percent | Volume swell in oil, percent [2] |
|---|---|---|---|---|---|
|  |  | 25% | 50% |  |  |
| Sample No.: |  |  |  |  |  |
| 1 | 8.33 | 1.1 | 2.4 | 38.4 |  |
| 2 [1] | Frothed latex collapses, no foam formed | | | | |
| 3 | 7.58 | 2.0 | 3.6 | 34.7 |  |
| 4 | 7.7 | 1.10 | 2.30 | 33.5 | 87.4 |
| 5 [1] | 7.6 | 0.87 | 1.77 | 30 | 109.9 |
| 6 | 9.7 | 1.05 | 2.4 |  |  |
| 7 [1] | 10.3 | 0.8 | 1.9 |  |  |
| 8 | 8.30 | 1.0 | 2.6 |  |  |
| 9 [1] | 8.35 | 0.7 | 1.6 |  |  |
| 10 | 12.2 | 1.1 | 3.8 |  |  |
| 11 [1] | Excessive foam shrinkage | | | | |

[1] Outside scope of invention.
[2] This property is measured by immersing the sample in "Texayce" Oil for 5 hours at 121° C. The volume is measured before and after the immersing step.

Attention is directed to the data illustrating that neoprene latex foams with good properties can be made from latices with solids contents as low as 50% when the isocyanate is added (sample 1); however, it is impossible to form a foam under these conditions without the isocyanate (sample 2). Also, it is noted that samples 4 and 5 show a substantial reduction in volume swell in oil when the isocyanate is added. Improved load bearing capacity results on adding isocyanates to natural rubber and ABR latex foams (samples 6 and 8 compared to controls 7 and 9 respectively). A good latex foam is prepared from the EPDM latex when isocyanate is added (sample 10), while a foam is not made in the absence of isocyanate (control 11).

EXAMPLE 3

The effect of elastomeric latex pH on the properties of foams formed from neoprene latex type 1 and incorporating polyisocyanate A is illustrated as follows:

A. Preparation of compounded elastomeric latices

Four samples (1–4) of neoprene latices (type 1) are compounded as in Example 1, sample 1.
Each of the compounded samples is identical except the pH of the neoprene latex in them varies as follows:

Sample No.:                          pH
1 (fresh latex) _____ 11.3
2 (via acetic acid) _____ 9.7
3 (via natural aging) _____ 9.7
4 (via oven aging) _____ 9.45

B. Preparation of gelling systems

Four identical gelling systems to be added to the compounded samples are prepared as follows:

Parts
Foam stabilizer (as prepared in Example 1) _____ 0.1
PSF _____ 2

C. Addition of organic polyisocyanates

To each sample is added 20 parts of polyisocyanate A with 0.4 part of the block copolymer added to sample 1 only.

The elastomeric foams are made by the same procedure as described in Example 1.

D. Physical properties of the elastomeric foams

The following table illustrates the physical properties of the foams:

|  | Density [1] | Compression/Deflection in p.s.i. at— | |
|---|---|---|---|
|  |  | 25% | 50% |
| Sample No.: |  |  |  |
| 1 | 5.34 | .51 | 1.12 |
| 2 | 5.11 | .56 | 1.24 |
| 3 | 5.0 | 1.0 | 1.9 |
| 4 | 4.9 | 1.4 | 2.5 |

[1] Lb./cu. ft.

EXAMPLE 4

The effect of different types of isocyanate additives on the elastomeric foam properties is illustrated as follows:

A. Preparation of compounded elastomer latices

Six samples of neoprene latex type 1 are compounded as in Example 1.
The pH's of the six samples vary as follows:

Sample No.:                          pH
1 _____ 12 via NaOH.
2 _____ 12 via NaOH.
3 _____ 9.7 via oven aging.
4 _____ 12 via NaOH.
5 _____ 9.5 via oven aging.
6 _____ 9.6 via oven aging.

Sample 6 also contains 1 part of trimene base.

B. Preparation of gelling systems

Four identical gelling systems prepared as follows are added to samples 1–4:

Parts
Foam stabilizer (Ex. 1) _____ 0.1
PSF _____ 2

Samples 5 and 6 each contain 2 parts of PSF as a gelling agent.

C. Addition of polyisocyanates

The table below indicates the types and amounts of polyisocyanate added to each sample and the physical properties of the resultant foams prepared generally according to the procedure of Example 1.

TABLE 4

|  | Polyisocyanate (Amount) | Density, lb./cu. ft. | Compression/Deflection in p.s.i. | |
|---|---|---|---|---|
|  |  |  | 25% | 50% |
| Sample: |  |  |  |  |
| 1 | B (20) | 5.8 | 1.0 | 2.6 |
| 2 | C (10) | 5.4 | 0.77 | 1.6 |
| 3 | D (20) | 6.2 | 1.2 | 2.0 |
| 4 | E/C (5/5) | 5.5 | 0.73 | 1.7 |
| 5 | F (20) | 4.6 | 1.0 | 1.6 |
| 6 | G (10) | 9.0 | 1.6 | 2.7 |

EXAMPLE 5

The improved flame resistance of isocyanate modified neoprene latex foams is illustrated as follows:

A. Preparation of compounded neoprene latices

Two samples (1 and 2) of compounded neoprene latices are prepared as follows:

| | Parts |
|---|---|
| Neoprene Latex Type 1 [1] | 100 |
| Zinc oxide | 7.5 |
| Phenyl-beta-naphthylamine | 2 |
| Trialkyl thioureas (Thiate B) | 2 |
| Sodium-dibutyl-dithiocarbamate | 1 |
| Petrolatum | 3 |

[1] Sample 1 has a pH of 9.7.

B. Preparation of gelling systems

Two gelling systems to be added to the neoprene latices are prepared as follows:

Sample 1

| | Parts |
|---|---|
| Foam stabilizer (as in Example 1, Sample 1) | 0.1 |
| PSF | 2 |

Sample 2

| | Parts |
|---|---|
| Catechol | 1 |
| SSF | 2 |
| Foam stabilizer (as in Example 1, Sample 1) | 0.1 |

C. Addition of isocyanate 20 parts of polyisocyanate A are added to Sample 1; Sample 2 is a control containing no polyisocyanate. The foams are prepared by the procedure of Example 1.

D. Flame resistance

The flame resistances of the foam prepared in Samples 1 and 2 are shown below. The flame tests are carried out according to ASTM-D 1962 in which a gas flame is applied to the end of the sample. The features measured are the self extinguishing and burning rate properties of the foams. (The presence of catechol in Sample 2 does not affect the results of the tests indicated below.)

Results are as follows:

| | Sample 1 | Sample 2 [1] |
|---|---|---|
| Horizontal Test: | | |
| Density, lb./cu. ft. | 7.6 | 7.1 |
| Average time to burn 1″ with external flame, sec. | >60 | 45 |
| Average time to self extinguish, sec. [2] | 0 | 95 |
| Average Burning rate, in./min. | 0 | 1.77 |
| Dripping | No | No |
| Vertical Test: | | |
| Time external flame applied, sec. | 5 | 5 |
| Average time to self-extinguish (after removal of flame), sec. | 1 | 6 |
| Average percent of material remaining | >98 | 92 |

[1] Outside scope of invention, included for comparison purposes only.
[2] Never ignited.

EXAMPLE 6

The use of the process of this invention to form polyisocyanate foams at a lower density than is possible when no polyisocyanate is added is illustrated as follows:

A foam sample is prepared as Sample 3 of Example 1 (outside scope of invention since no polyisocyanate is added), except the latex composition is frothed to an apparent density of 5.0 lb./ft.³. The foam collapses upon gellation; no foam is formed on which physical properties can be measured.

When 20 parts of polyisocyanate A are added to the same composition and it is frothed to a density of 5.0 lb./cu. ft. a useful foam having the following properties is obtained:

| | |
|---|---|
| Density lb./ft.³ | 5.0 |
| Compression/deflection at 25% p.s.i. | 1.0 |
| Compression/deflection at 50% p.s.i. | 1.9 |

EXAMPLE 7

The use of the process of this invention in forming isocyanate modified foams in the absence of conventional compounding and curing agents is illustrated as follows:

Two samples are prepared, each one contains 100 parts of neoprene latex type 1.

The two samples are whipped into froths and the same procedure is followed as in Example 1 except only 40 parts of polyisocyanate A are added to Sample 1, and no other compounding ingredients are added to Sample 2 (outside scope of invention).

No foam is formed in the control Sample 2 on which to measure physical properties. A foam having the following properties is formed from Sample 1:

| | |
|---|---|
| Density lb./cu. ft. | 4.3 |
| Compression/deflection at 25% p.s.i. | 0.40 |
| Compression/deflection at 50% p.s.i. | 1.1 |

As many widely different embodiments of this invention may be made without departing from the spirit and scope thereof, it is to be understood that this invention is not limited to the specific embodiments thereof except as defined in the appended claims.

What is claimed is:

1. In a process for preparation of a foam by frothing an aqueous latex of a sulfur curable elestomeric polymer, the improvment consisting essentially of incorporating into the elastomeric latex about 10 to 100 parts by weight of an organic polyisocyanate per 100 parts of elastomeric solids in the latex.

2. The process of claim 1 wherein the elastomer latex is compounded, frothed, gelled, and cured.

3. The process of claim 2 wherein the sulfur-curable elastomer latex is selected from the group consisting of natural rubber latex, styrene-butadiene rubber latex, polybutadiene latex, synthetic polyisoprene latex, polychloroprene latex, isobutylene-isoprene latex, acrylonitrile-butadiene latex, and chain saturated α-olefin hydrocarbon copolymer latices and the polyisocyanate is selected from at least one isocyanate in the group consisting of 2,4 and 2,6-toluene diisocyanates and mixtures thereof, 4,4′-methylene-bis(phenyl isocyanate), metaphenylene diisocyanate 4,4′ - methylene - bis(cyclohexyl isocyanate), decamethylene diisocyanate and the undistilled polyisocyanates that result from the phosgenation of toluene diamines, phenylene diamines, 4,4′-methylene-bis (cyclohexylamine), 4,4′-methylene-bis(phenylamine) and the methylene bridged polyphenyl polyamines prepared by condensing about 1.1 to 10 moles of aniline with 1 mole of formaldehyde.

4. The process of claim 3 wherein the polyisocyanate is the undistilled product obtained by phosgenating undistilled 4,4′-diamino diphenyl methane, said polyisocyanate containing about 80% by weight 4,4′-methylene-bis(phenyl isocyanate), having an acidity of about 0.06% HCl and 0.10% hydroylzable chloride and is incorporated in the amount of about 10 to 25 parts by weight per 100 parts of elastomeric solids in the latex.

5. The process of claim 3 wherein the polyisocyanate is about 10 to 25 parts of an undistilled product of phosgenation of the methylene bridged polyphenyl polyamines prepared by condensing about 1.1 to 10 moles of aniline with 1 mole of formaldehyde, said polyisocyanate having an average functionality of about 3 isocyanato groups per molecule and containing about 50% by weight 4,4′-methylene-bis(phenyl isocyanate).

6. The process of claim 3 wherein the elastomer latex is a high gel polychloroprene latex having a solids content from about 50 to 59% by weight, and a Brookfield viscosity of from about 23 to 350 cps.

7. The process of claim 3 wherein the elastomer latex is a styrene-butadiene rubber latex in which the styrene-butadiene copolymer has from about 20 to 25% styrene by weight and the latex has a solids content from about 60 to 73% by weight.

8. The process of claim 3 wherein the polyisocyanate is added during the frothing step.

9. The process of claim 8 wherein the elastomer latex is a high gel polychloroprene latex having a solids content of from about 50–59% by weight, a Brookfield viscosity of from about 23 to 350 cps., a pH of from about 9.3 to 9.8 attained by aging the latex and the polyisocyanate is the undistilled product obtained by phosgenating undistilled 4,4′-diamino diphenyl methane, said polyisocyanate containing about 80% by weight 4,4′-methylene-bis(phenyl isocyanate), having an acidity of about 0.06% HCl and 0.10% hydrolyzable chloride and is incorporated in the amount of about 10 to 25 parts by weight per 100 parts of elastomeric solids in the latex.

10. The process of claim 8 wherein the elastomer latex is a high gel polychloroprene latex having a solids content of from about 50–59% by weight, a Brookfield viscosity of from about 23 to 350 cps., a pH of from about 9.3 to 9.8 attained by aging the latex, and the polyisocyanate is about 10 to 25 parts of an undistilled product of phosgenation of the methylene bridged polyphenyl polyamines prepared by condensing about 1.1 to 10 moles of aniline with 1 mole of formaldehyde, said polyisocyanate having an average functionality of about 3 isocyanato groups per molecule and containing about 50% by weight 4,4′-methylene-bis(phenyl isocynate).

References Cited
UNITED STATES PATENTS 2,993,013   7/1961   Wolfe.

MURRAY TILLMAN, *Primary Examiner.*
MORTON FOELAK, *Assistant Examiner.*

U.S. Cl. X.R.
260—29.7, 3, 859